July 20, 1954 W. W. PHARIS 2,684,407

SELECTOR

Filed Oct. 28, 1952 2 Sheets-Sheet 1

INVENTOR.
WILLIAM W. PHARIS
BY Francis E. Blake
ATTORNEY

July 20, 1954 W. W. PHARIS 2,684,407

SELECTOR

Filed Oct. 28, 1952 2 Sheets-Sheet 2

INVENTOR.
WILLIAM W. PHARIS
BY Francis E. Blake
ATTORNEY

Patented July 20, 1954 2,684,407

UNITED STATES PATENT OFFICE 2,684,407

SELECTOR

William W. Pharis, Rochester, N. Y., assignor to Stromberg-Carlson Company, a corporation of New York Application October 28, 1952, Serial No. 317,291

2 Claims. (Cl. 179—18)

The present invention relates to telephone systems and more particularly to an improved selector circuit for use with dial telephone systems.

Telephone exchanges adapted to be used with modern telephone systems employ considerable amounts of relatively complex equipment and circuits therefor. Many of these circuits are directively controlled for selective operation in response to dial impulses to thereby control the operation of switches for connecting the calling line to the desired called line. There are a number of principal types of individually selectable circuits for use to directively control switching mechanisms such as linefinder circuits, selector circuits, and connector circuits. In the case of a selector circuit, such circuit may normally have three principal conditions of operation, i. e., the free or idle condition ready for seizure by other circuits; seized by other circuits but not in the talking condition; or seized and in the talking condition. In monitoring the operation of the selector circuit and its associated switch mechanism it is desirable to be able to ascertain at a glance the principal operative condition of the circuit as mentioned above.

It is an important object of the present invention to provide an improved selector circuit having visual signal means to indicate its various principal conditions of operation.

A feature of the invention is the provision of a monitor signal lamp to be brightly illuminated when the selector circuit is seized by either preceding or succeeding circuits but not in the talking condition, and to be dimly illuminated when the selector circuit is in the talking condition, the arrangement being such that the lamp is not illuminated when the selector circuit is idle, thus conserving power.

Figure 1:
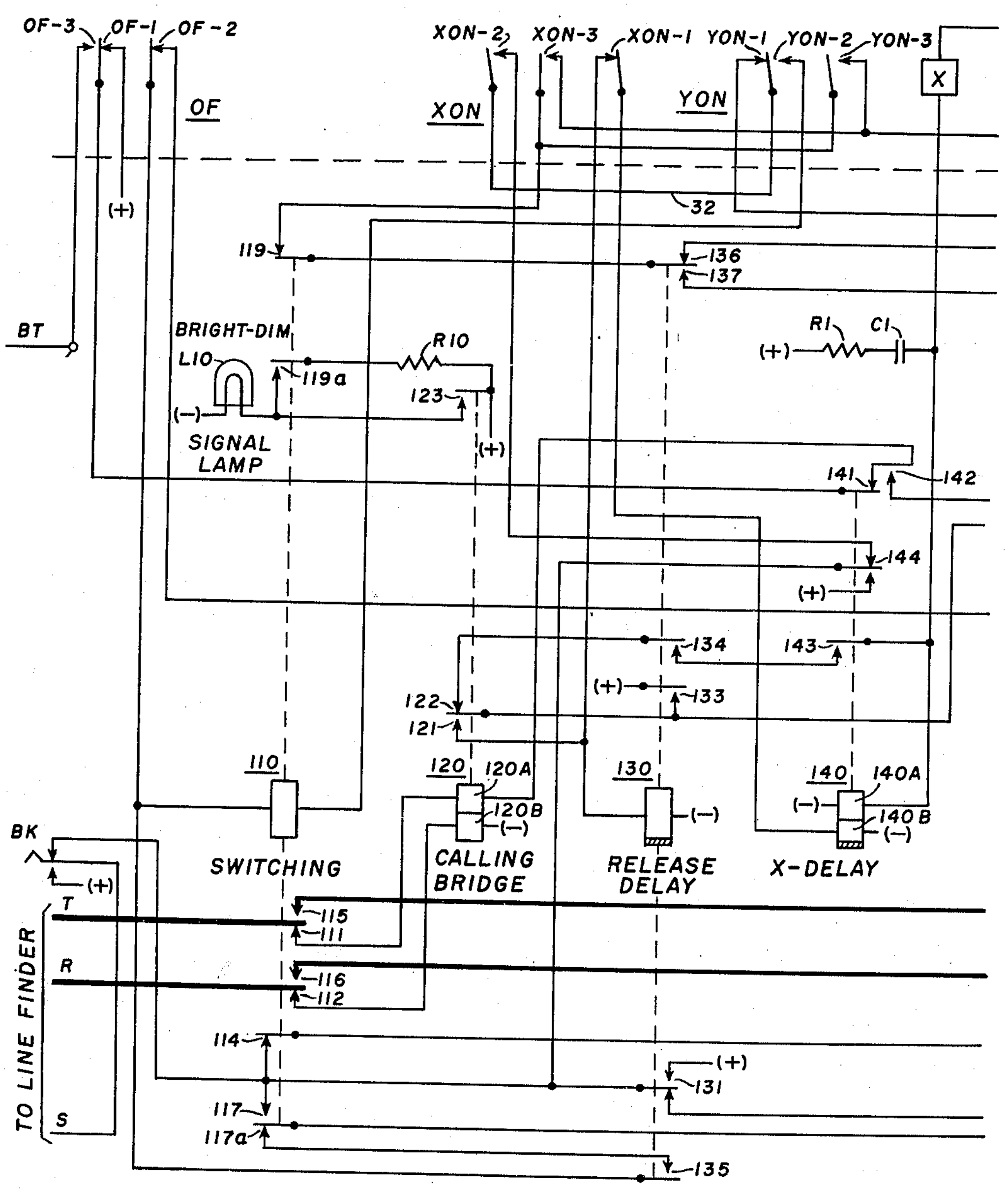
Figure 2:
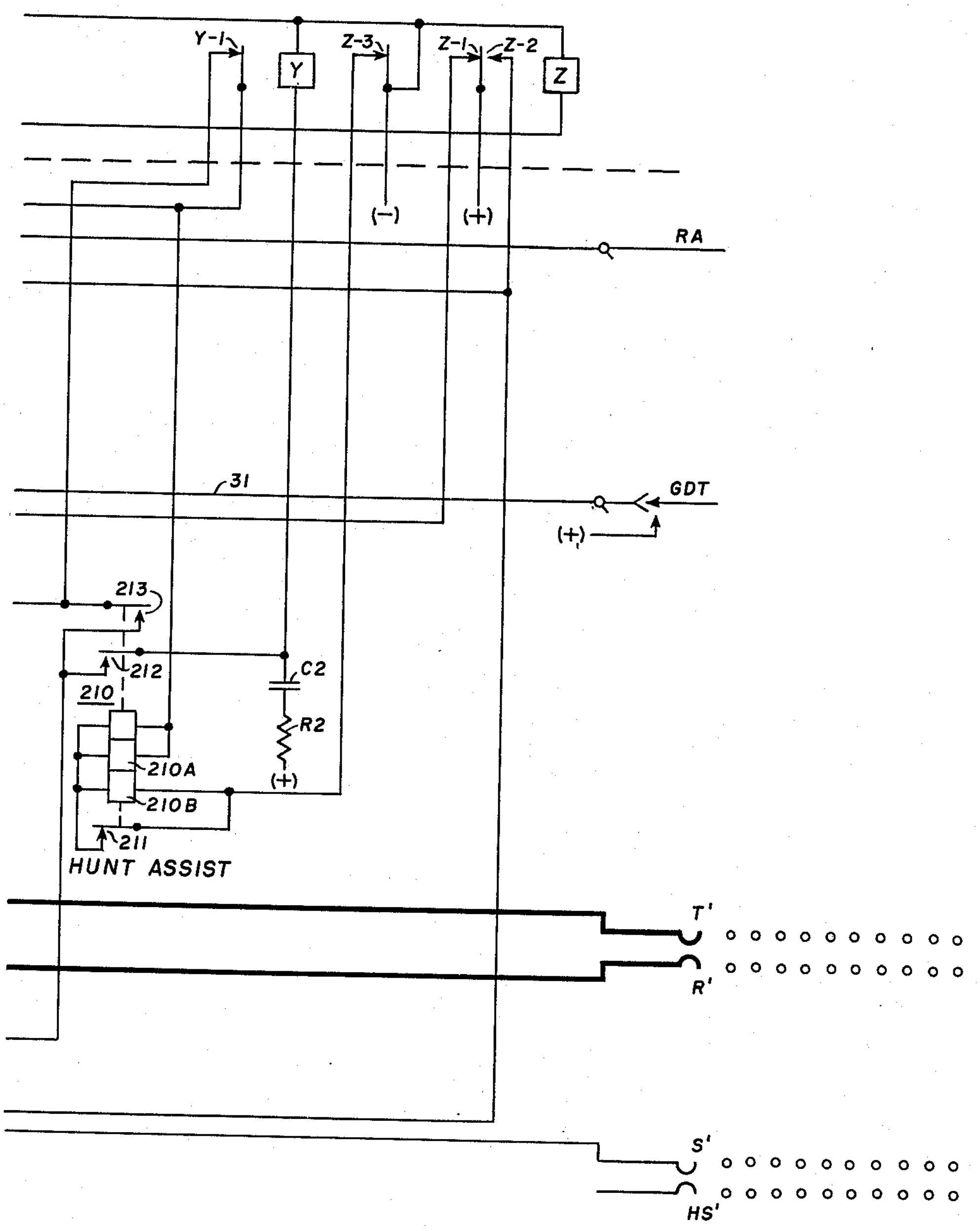

Other objects, features, and the attending advantages of the invention will be apparent with reference to the following specification and drawings in which Figs. 1 and 2, with Fig. 2 placed to the right of Fig. 1, form a complete diagram of the selector circuit of the invention.

Referring to the drawings, the battery designations (+) and (−) are used. Hereinafter, the expression "battery" will indicate the negative terminal of the battery and the (+) symbol will indicate the positive terminal of the battery, and it is to be understood that the positive terminal of the battery is also connected to ground so that the use of the word "ground" is indicative of a connection not only to ground but also to the positive terminal of the station battery.

The selector switch mechanism for use with the circuit of the invention is preferably of the step-by-step type and, for example, may be of the flat type in which the main set of switch wipers move in a single plane, the secondary being at right angles to the primary movement. The switch shown in the drawings comprises a main set of wipers including four wipers or brushes indicated as tip T', ring R', sleeve S', and hunt sleeve HS', respectively. In the present description of the invention, the hunt sleeve brush HS' serves no useful purpose although its application to dial telephone systems for purposes of supervision, message rate metering and other similar signaling and control functions is known. The switch also includes a set of overflow switches OF, off-normal switches XON which are operated when the switch moves off-normal in the primary direction, and a second set of off-normal switches YON which operate when the switch takes its first step in the secondary direction. The switch further includes primary and secondary direction magnets X and Y, respectively, and a release magnet Z together with release magnet switch contacts Z1—Z3.

Assuming that the previous switching equipment such as a linefinder and circuit has been extended to the tip, ring, and sleeve leads, T, R, and S respectively (Fig. 1), a circuit is completed for operating the calling bridge relay 120 over a loop extending from ground appearing on the normal contacts OF-1 of the overflow switch pile up through normal contacts 141, winding 120A, normal contacts 111, tip lead T, calling loop, ring lead R, normal contacts 112, and winding 120B to battery. In response to the operation of relay 120, the delay relay 130 and the X delay relay 140 are energized in parallel over circuits extending from ground appearing on the normal contacts Z-1 of release magnet Z through operated contacts 121 and winding of relay 130 to battery and from ground through normal contacts Z-1, operated contacts 121, normal contacts XON-1 of the X off-normal pile up XON, and through winding 140B to battery, respectively.

The previously described operation of the calling bridge relay 120, upon seizure of the selector circuit by the preceding circuit, closes contacts 123 to energize and brightly illuminate the monitor signal lamp L10 directly from battery to ground. The brightly illuminated monitor lamp thus indicates that the selector circuit is seized but not in the talking condition since the switching relay 110 is not yet operated.

The previously described operation of delay relay 130 effects the application of ground to the back sleeve lead S through operated contacts 131 and busy key BK. If it is desired to furnish dial tone from the selector circuit, the dial tone lead GDT, Fig. 2, is connected to the tip side of the line through conductor 31, operated contacts 142, winding 120A of relay 120, and normal contacts 111. With this arrangement the dial tone is removed when X-delay relay 140 releases at the completion of the group of impulses of the first digit.

When the calling party dials the first digit, the loop applied to the calling bridge relay 120 is interrupted according to the number of impulses for the digit dialed and relay 120 thereby pulses. Upon each closure of normal contacts 122, ground by way of operated contacts 133 is applied through normal contacts 122, operated contacts 134 and 143, and the primary direction magnet X to battery, resulting in the stepping of the selector switch in the primary direction.

Referring back now to the initial energization of the stepping magnet X, the main set of switch wipers T', R' and S' has been moved one step in the X direction. It is noted at this point that both delay relays 130 and 140 are provided with slow-to-release characteristics so that both of these relays hold operated over the group of dial pulses referred to above. When the selector switch takes the first step in the X direction, the X off-normal contact springs XON operate and thereby deenergize winding 140B at now open contacts XON-1, but relay 140 holds operated until the last impulse has been received over a circuit extending from battery through winding 140A, operated contacts 143 and 134, normal contacts 122, and operated contacts 133. Thus, relay 140 holds operated over the pulsing ground through the pulsing contacts 122 of the calling bridge relay 120. Relay 140 releases at the end of the delay period following the conclusion of the dialed digit at which time ground on operated contacts 131 of relay 130 (relay 130 remaining energized through operated contacts 133 and now closed contacts 121) is conducted through normal contacts 144, operated off-normal contacts XON-2, conductor 32, normal contacts YON-1, of the Y off-normal springs, winding 210A of hunt relay 210, normal contacts 211 and normal contacts Z-3 of the release magnet Z to battery.

The foregoing circuit operates relay 210 to close a path operating the stepping magnet Y over a circuit extending from battery through magnet Y, operated contacts 212, normal contacts 114, and operated contacts 131 to ground. This circuit energizes stepping magnet Y and causes the selector switch to move one step in the secondary or Y direction into the level of the bank of contacts or terminals.

At this point it should be noted that upon the operation of hunt relay 210, that relay is locked up from ground on operated contacts 131 through normal contacts 114, operated contacts 213, interrupter spring Y-1 to winding 210A. Thus, relay 210 is held operated until the stepping magnet Y operates to open the interrupter springs Y-1.

As the switch advances in the Y direction, the sleeve or test wiper S' is employed to make the usual busy test. Means (not shown) is provided for applying a desired potential, usually ground, upon the sleeve bank terminals or contacts in the sleeve banks to indicate a busy condition of the line or trunk terminating in that contact or terminal. If the first sleeve or test contact is not marked as busy, the circuit is completed for operating the switch relay 110 to extend the back tip and ring leads T and R to the tip and ring brushes T' and R' respectively, in order to extend the call to the succeeding equipment. For this purpose ground is forwarded from operated contacts 131 through normal contacts 144, operated contacts XON-2, conductor 32, operated contacts YON-2, winding of switching relay 110, normal contacts OF-2 of the overflow pile up OF, Y-interrupter Y-1, windings 210A and 210B in series, and through release magnet switch contacts Z3 to battery. Switching relay 110 operates from the resulting current flow over the above-described path but relay 210 does not operate because that relay is not designed to operate on the relatively low current now flowing.

Operation of relay 110 extends the tip and ring leads T and R to the tip and ring brushes T' and R', respectively, at the operated contacts 115 and 116, respectively, and the circuit for the calling bridge relay 120 is thereby broken to thus release such relay. With the switching relay 110 operated and the calling bridge relay 120 released, the selector circuit is now in what may be termed the seized and talking condition, and contacts 119A are closed while contacts 123 are open to thus connect the resistor R10 in series with the monitor signal lamp L10 between battery and ground. In such manner the monitor signal lamp is now dimly illuminated to indicate the seized and talking condition of the selector circuit.

The operation of switching relay 120 extends the sleeve lead S to the sleeve or test wiper S' at operated contacts 117. With the circuit for maintaining the relay 120 broken at contacts 111 and 112, the resulting release of relay 120 deenergizes relay 130 at now open contacts 121 and, after a time, relay 130 releases.

The foregoing discussion related to the test brush S' encountering an idle sleeve contact for an idle line. It may now be assumed that the test wiper S' encounters a busy contact and circuit as indicated by presence of ground on the first sleeve test contact. Ground thereby appears on the sleeve wiper S' and is conducted through normal contacts 117A and operated contacts 135 to winding of relay 110. Inasmuch as the other terminal of the winding of relay 110 is connected to ground through off-normal springs YON-2, conductor 32, off-normal contacts XON-2, normal contacts 144 and operated contacts 131, relay 110 is shunted down by the presence of ground on both sides of the coil. Therefore, the switching relay 110 cannot operate. This sleeve ground indicative of a busy condition is also conducted through overflow springs OF-2 and interrupter contacts Y-1 to winding 210A in order to reoperate the hunt relay 210.

Upon the reoperation of relay 210, stepping magnet Y is again operated from ground by way of operated contacts 212 so that the Y magnet receives another pulse to advance the switch to the second position in the level. In order to assure that the Y magnet will operate and that switching relay 110 will remain shunted down until the next contact in the level is reached, ground on operated contacts 131 is forwarded through normal contacts 114, operated contacts 213, interrupter contacts Y-1 to relay winding 210A and thence to battery by way of normal contacts 211 and Z-3, thereby holding operated the hunt relay 210.

At the next contact the foregoing busy test is repeated. If the outlet is idle, the selector is switched through but if the outlet is busy, the selector continues to hunt until an idle outlet is found. If all outlets are busy, the switch steps into the Y overflow position thereby operating the overflow pile up OF. Operation of the overflow springs is utilized to prevent further operation of relay 210 because of the opening of its operating circuit at contacts OF-2. Busy tone is forwarded from the busy tone lead BT through operated overflow contacts OF-3, normal contacts 141, winding 120A, normal contacts 111, and tip lead T to the calling line or incoming trunk to thereby inform the calling party that all levels are busy.

Assuming that the succeeding circuit is seized, ground is returned on the front sleeve in any suitable manner by way of test wiper S′ through operated contacts 117, normal contacts 144, operated contacts XON-2, conductor 32, operated off-normal contacts YON-2 to switching relay winding 110 in order to hold relay 110 operated.

The circuit of Figs. 1 and 2 is released upon the removal of ground on the succeeding circuit as by hanging up by the called party. Release of relay 110 effects energization of release magnet Z from ground (not shown) on lead RA through normal contacts 136 and 119, operated contacts XON-3 and YON-3 in parallel, through the release magnet Z to battery. At the same time, the restoration of the switching relay 110 opens contacts 119A to deenergize the monitor signal lamp L10 thus indicating that this circuit is idle. It should be pointed out that the selector switch circuit is normally in the idle condition for the greater part of the time and that the monitor signal lamp arrangement of the invention therefore operates with economy since the lamp is not illuminated for that greater portion of the time when the circuit is not in use. It will be understood that the condition of selector operation having the second greatest average period of use is when the selector circuit is seized and in the talking condition, i. e., switched through. At such time, the monitor signal lamp is dimly illuminated to conserve power.

While the monitor signal lamp arrangement of the invention has been described with a particular form of selector circuit, it should be understood that the signaling arrangement may be used with any form of selector circuit having at least a first relay to respond to the seizure of the circuit and a second relay to be operated when the selector circuit is switched through. Various modifications may be made within the spirit of the invention and the scope of the appended claims.

What I claim is:

1. A monitor signal lamp circuit to indicate the operative condition of a telephone selector circuit for selectably connecting a preceding circuit to a succeeding circuit, said switch circuit having incoming connections to said preceding circuit and outgoing connections to said succeeding circuit and switch means therebetween, said switch means when operated being effective to establish a circuit connection between said incoming connections and said outgoing connections, including in combination, a power source, a signal lamp, a resistance, circuit means responsive to the connection of said switch circuit to said preceding circuit to connect said lamp directly to said source of power, and circuit means responsive to the operation of said switch means and the consequent connection of said switch circuit to both preceding and succeeding circuits for connecting said lamp to said power source in series with said resistance.

2. A selector switch circuit for connecting a preceding circuit to a succeeding circuit in a telephone system and having a monitor signal lamp arrangement including in combination, a power source, a resistance, a signal lamp, a first relay adapted to be operated when said switch circuit is connected to said preceding circuit, a second relay adapted to be operated when said switch circuit is switched through to connect said preceding ciruit to said succeeding circut, circuit means including operated contacts of said first relay and normal contacts of said second relay to connect said signal lamp directly to said power source, and circuit means including normal contacts of said first relay and operated contacts of said second relay to connect said lamp in series with said resistance to said power source.

No references cited.